United States Patent [19]

Eckerle

[11] Patent Number: 4,977,784

[45] Date of Patent: Dec. 18, 1990

[54] AXLE SPINDLE LOAD AND TORQUE SENSING APPARATUS AND METHOD FOR SENSING LOAD AND TORQUE

[75] Inventor: Joseph S. Eckerle, Redwood City, Calif.

[73] Assignee: SRI International, Menlo Park, Calif.

[21] Appl. No.: 348,686

[22] Filed: May 8, 1989

[51] Int. Cl.$^5$ .......................... G01L 1/10; G01B 17/04
[52] U.S. Cl. ................................. 73/862.54; 73/778; 73/862.04; 177/136
[58] Field of Search ................ 73/778, 862.54, 862.59, 73/DIG. 1, 862.04; 177/136, 210 FP

[56] References Cited

U.S. PATENT DOCUMENTS

| | | | |
|---|---|---|---|
| 2,880,612 | 4/1959 | Coyne et al. | 73/DIG. 1 |
| 3,242,738 | 3/1966 | Bellier | 73/DIG. 1 |
| 3,488,997 | 1/1970 | Kliever | . |
| 3,584,505 | 6/1971 | Seligmann | 73/862.06 |
| 3,626,754 | 12/1971 | Haagen et al. | 73/778 |
| 3,780,817 | 12/1973 | Videon | . |
| 3,889,525 | 6/1975 | Bailey | 73/DIG. 1 |
| 4,274,501 | 6/1981 | Gallo et al. | . |
| 4,614,245 | 9/1986 | Yamanaka | . |
| 4,623,813 | 11/1986 | Naito et al. | . |

Primary Examiner—Charles A. Ruehl
Attorney, Agent, or Firm—John P. Taylor; Richard P. Lange

[57] ABSTRACT

The invention comprises a vehicle load sensor apparatus for measuring the load on one or more spindles of a vehicle axle which comprises a vehicle axle spindle, a string or wire is attached to the vehicle spindle, and a means for measuring the change of tension in the string. The tension in the string is measured by inducing a vibration in the string and then measuring the frequency of vibration of the string which is proportional to the square root of the tension in the string. The change of tension is then determined by comparing this measured tension in the string to the tension in the string previously measured under no-load conditions. In a preferred embodiment, both the load and the torque on an axle or spindle may be determined using the disclosed apparatus and method by using a first string attached to a point adjacent to the front of the spindle and a second string attached to a point adjacent to the rear of the spindle and comparing the changes of tension in the front string to the changes of tension in the rear string to determine the torque acting on the end of the axle.

23 Claims, 2 Drawing Sheets

AXLE SPINDLE LOAD AND TORQUE SENSING APPARATUS AND METHOD FOR SENSING LOAD AND TORQUE

BACKGROUND OF THE INVENTION

1. Field of the Invention

This invention relates to a load and torque sensing device. More particularly, this invention relates to a device for measuring the load and torque on an axle of a vehicle by measuring the resonant frequency of one or more wires, the tension on which is affected by the load.

2. Description of the Prior Art

Axle loads on vehicles, such as trucks, have previously been measured using various sensors, such as strain gauges. The use of such strain gauges in the sensing of axle loads are described in Kliever U.S. Pat. No. 3,488,997 and Videon U.S. Pat. No. 3,780,817.

Kliever U.S. Pat. No. 3,488,997 provides an apparatus for measuring the weight supported by landing gear of an aircraft by sensing the deflection of an arm rigidly mounted at an intermediate point to portions of the landing gear. The deflection at each end of the arm is sensed using a strain gauge, displacement sensor, force or movement transducer, etc.

Videon U.S. Pat. No. 3,780,817 teaches apparatus for measuring the weight on a truck axle using strain gauges which measure the shortening or flexing of a spring bar. The bar is connected at each end to the respective ends of an axle and acts to amplify the axle motion thereby subjecting the strain gauges to greater strains than if the gauges were mounted directly to the axle.

However, sensors using strain gauges suffer from several drawbacks including a rather large temperature sensitivity; as well as the small size and delicacy of the devices, which make then incompatible with the environment and skills associated with their use in truck axles. In addition, while the strain gauge itself is relatively inexpensive, the cost of a completed strain gauge sensor is not; due to the costs of installation, protection of the sensor, and connection to external equipment. Furthermore, the output signal from a strain gauge sensor is typically a low-level signal.

Other types of load sensing devices are known. For example, Gallo et al U.S. Pat. No. 4,274,501 describes a force measuring system wherein a load on a frame flexes an intermediate body on which are mounted two springs. Each spring is attached through a wire to an opposite end of a rigid measuring system. This system may comprise a force measuring cell with two vibrating strings.

Yamanaka U.S. Pat. No. 4,614,245 discloses a device for measuring a force utilizing two elastic cantilever arms between which is located a metal string. When the string is deflected, a permanent magnet located next to the string causes a current to be induced in the wire. The wire is coupled to an amplifier so that the induced currents set up a vibration in the string at its resonant frequency. The tension in the string can be calculated from this frequency.

Naito et al U.S. Pat. No. 4,623,813 describe a load sensor in which a shear-deformable member is located between a fixed member and a movable member. Flexible surface wave transducers comprising resonators are located on the shear-deformable member and have interdigited electrodes. Deformation of the shear-deformable member under load changes the clearance between the transducers which changes the resonant frequency of the resonators to change the oscillation frequency of the resonators.

In the measurement of vehicle loads, it is also known to measure the deflection of the vehicle springs using a sensor typically attached between the axle and the vehicle frame. However, such displacement sensors are typically not rugged and are mounted in a rather vulnerable location on the vehicle and are, therefore, easily damaged by dust, dirt, and grease. Sealing the sensor to prevent such damage increases the cost.

It would, therefore, be desirable to provide load sensing directly associated with the axle which could be housed within an axle housing, would be capable of operating accurately over a wide temperature range, would be rugged and long-lived, easily installed, inexpensive, and capable of providing a high-level electrical output. Advantageously, the sensor would be capable of independently measuring the load on each end of the axle and, in a preferred embodiment, be capable of measuring both axle load and torque.

SUMMARY OF THE INVENTION

It is, therefore, an object of the invention to provide a load sensor system for a vehicle axle capable of determining the load on a vehicle axle based on the deflection of the axle.

It is another object of the invention to provide a load sensor system for a vehicle axle capable of determining the load on the vehicle axle based on the deflection of the axle by measuring the tension in a string attached, at one end, to the axle spindle, to determine the load on the axle.

It is still another object of the invention to provide a load sensor system for a vehicle axle capable of determining the load on the vehicle axle based on the deflection of the axle by measuring the resonant frequency of a string attached to the axle spindle and calculating the tension from the measured frequency to determine the load on the axle spindle.

It is yet another object of the invention to provide a load sensor system for a vehicle axle capable of determining the load on each bearing spindle of the axle by attaching a string to each bearing spindle and measuring the resonant frequency of each string to determine the load on the associated spindle from the tension in the string as measured by the resonant frequency of the string.

It is a further object of this invention to provide an improved load sensor device capable of measuring both the load and the torque on the end of an axle by comparing the measured tension in a first string attached to a forward portion of the bearing spindle with the measured tension in a second string attached to a rearward portion of the same spindle.

It is still a further object of this invention to provide a method for measuring both the load and the torque on the end of an axle by respectively measuring the tensions in a first string attached to a forward part of the bearing spindle and in a second string attached to a rearward portion of the same spindle to determine the load on the spindle; and using the measured difference in tensions in the two strings to determine the torque on the spindle.

These and other objects of the invention will be apparent from the following description and accompanying drawings.

DESCRIPTION OF THE INVENTION

The invention provides a load sensing apparatus and method for sensing the load on an axle or spindle of a vehicle by measuring the resonant frequency of a vibrating string attached to the axle or spindle to thereby determine the tension in the string which is related to the load on the axle or spindle. In a preferred embodiment, the system may be used to measure both the load and torque on each end of an axle. It will be understood that the use of the term "vehicle" herein is intended to include both motor driven vehicles, such as a truck or a passenger vehicle, and non-motor driven vehicles such as a trailer.

Figure 1:
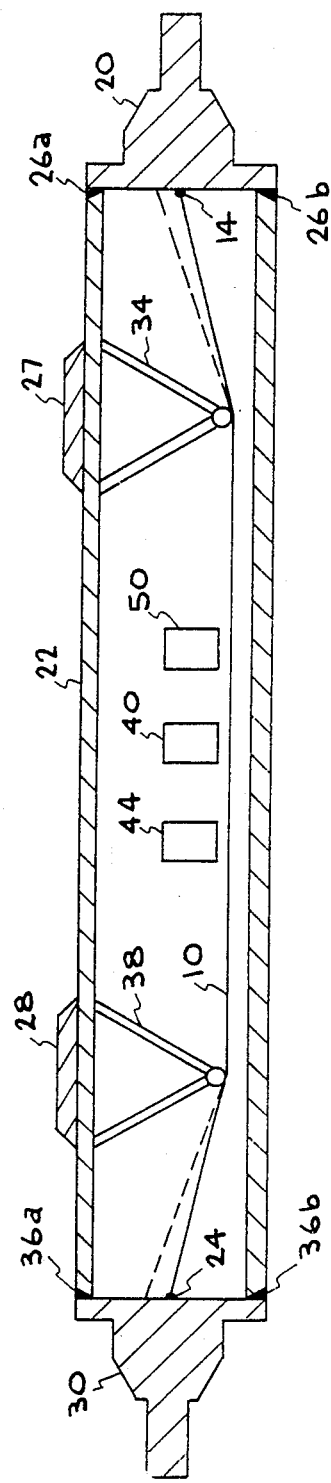
FIG. 1 is a vertical cross-sectional view of one embodiment of the invention wherein the loads on both spindles of an axle are simultaneously measured.

In a first embodiment of the invention, as shown in FIG. 1, a string or wire 10 is attached, at a first end 14 to a point adjacent to the center of a first bearing spindle 20. String or wire 10 is attached, at a second end 24 to a point adjacent to the center of a second spindle 30. Spindles 20 and 30 are welded, respectively at 26a, 26b and 36a, 36b, to the opposite ends of an axle tube 22. Also mounted to axle tube 22 are spring attachment pads 27 and 28 through which the axle assembly of FIG. 1 may be coupled to a vehicle (not shown).

It should be noted at this point that the term "spindle", as used herein, is intended to define the end portion of the axle or axle housing, i.e., the portion of the axle on which a wheel would be mounted. Thus, the spindle may or may not be a separate member attached to the end of the axle or axle housing. If brakes are mounted to the axle, the brake mechanism normally attaches to the end of the axle in the vicinity of welds 26a, 26b, 36a, and 36b. The load on the axle is carried by the spindle, while braking torques are carried by the axle tube 22.

It should also be noted that attachment of the string 10 to a point adjacent the center of the spindle is intended to define a point of attachment close enough to the spindle so that movement of the spindle, based on changes in the load or torque, will result in a change in the length of string 10 which, in turn, will result in change of the tension in string 10 thereby changing the vibrational frequency of string 10 as will be described below. Therefore, the expression "a point adjacent the center of the spindle" may be defined as a point spaced from the center of the spindle a distance approximately equal to or less than the diameter of the axle.

String or wire 10 may comprise a steel wire having a diameter of from about 0.1 to about 10 millimeters. One preferred material for wire 10 is music wire, which has a very high yield strength. Other cross-sectional shapes or sizes may be used for wire 10 without departing from the scope of this invention. In particular, square or elliptical wire may be advantageous. Other materials such as, for example, aircraft control cable may also be used for string 10 provided that they are capable of stretching under load so that the tension in wire 10 may be determined based on the change in resonant frequency of vibration of string 10 as will be discussed further below.

A first vibration inducing means 40 may be located within axle tube 22 adjacent string 10 to induce a vibration in string 10. This vibration may then be sensed by a sensor 50 which is also located within axle tube 22 adjacent string 10 and which is capable of sensing the frequency of vibration of the string.

Vibration inducing means 40 may comprise an electromagnetic transducer energized by an external power source to induce a vibration in string 10 when string 10 comprises a ferromagnetic metal such as steel. If wire 10 comprises a nonferromagnetic material, a sleeve of ferromagnetic material may be attached to string 10 in the vicinity of vibration inducing means 40 and sensor 50.

The tension in string 10 will be varied by the load on spindles 20 and 30. Increasing load causes downward movement of axle tube 22 relative to spindles 20 and 30 as shown by the dotted lines in FIG. 1. This movement stretches string 10. As the tension in string 10 is varied, its resonant frequency of vibration will change.

Sensor means 50 may comprise electronic means, such as any of a number of commercially available proximity sensors operating on optical, capacitive, magnetic, or eddy-current principles. One such device is the Model AH-305 (sensor) with the Model AS-440U-01 (controller) available from the Keyance Corporation of America. From the point of view of low cost and ruggedness, a preferred form of sensor 50 would consist of a coil of wire, mounted to a suitable armature.

Alternatively, sensor means 50 and vibration inducing means 40 may be provided in a single device 44 having a vibration inducing means, such as a first energized coil and frequency sensing means, such as a second coil. Finally, a single coil could alternatively be used for both purposes.

Within axle tube 22 may be located a first string support 34 and a second spring support 38. Supports 34 and 38 maintain string 10 in a stationary position, with respect to vibration inducing means 40 and frequency sensor 50, when spindles 20 and 30 move vertically as the load thereon changes.

The tension in string 10 may be determined from the sensed frequency using the formula:

$$f = \frac{1}{2L} \sqrt{\frac{T}{m}} \tag{1}$$

where
L = the length of string 10
T = the tension in the string
m = the mass per unit length of string 10
f = the resonant frequency in cycles per unit time Solving equation (1) for T, the equation may be written as:

$$T = 4mf^2L^2 \tag{2}$$

To obtain the change in tension, $\Delta T$, the initial tension $T_o$, without a load may be determined by inducing a vibration in string 10 and measuring this no-load resonant frequency from which the no-load tension is calculated followed by determining the tension under load and then subtracting the initial tension $T_o$ from the tension T determined from the frequency measurement made under load.

$$\Delta T = T - T_o \tag{3}$$

The load may then be determined by multiplying the change in tension by a constant $K_l$, which may be obtained by initial calibration of the particular axle or spindle.

$$\text{Load} = K_l \Delta T \tag{4}$$

In opeation then, as the load on spindles 20 and 30 increases, axle tube 22 lowers, with respect to spindles 20 and 30, increasing the length of string 10 (stretching it) which increases its tension. The vibration frequency of string 10, as induced by vibration inducing means 40, thus increases. This increase in frequency is then sensed by sensor 50. From the measured frequency increase, the increased tension in string 10 may be determined. From this measured tension change the increase in the size of the load may be determined by multiplying the change in tension by the constant, $K_l$, for the axle.

It should be noted that while only one such string 10 is illustrated, the simultaneous use of more than one string is to be considered within the scope of the invention. One or more strings may be used, for example, when it is desired to have a backup string should one of the strings break, or as a check on the calibration of the other string or strings.

Figure 2:
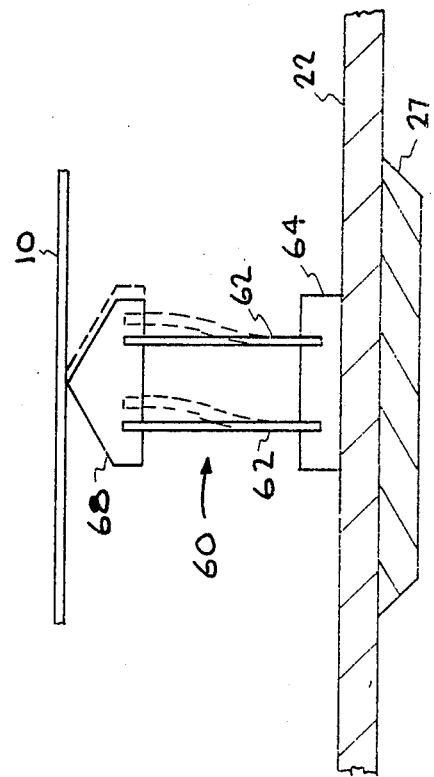
FIG. 2 is a fragmentary vertical view of an alternate string support means for the embodiment of FIG. 1 for those instances where the expanding or contracting string does not slide over the string support.

Turning now to FIG. 2, an alternative string support means 60 is shown wherein thin flexible metal members 62 are provided between a base portion 64 and a string carrier member 68 of string support means 60. In this version, the string or wire need not slide along the carrier as the string or wire stretches since flexible members 62 will bend as shown by the dotted lines in FIG. 2. Some recalibration may be necessary due to the presence of string support means 60 as opposed to the embodiment of FIG. 1.

Thus, the load on the axle spindles 20 and 30 may be determined by measuring the resonant frequency of vibration of string 10. However, it must be noted that in this embodiment, the tension in string 10 is caused by the combined load on axle spindles 20 and 30 which may not be equal.

Figure 3:
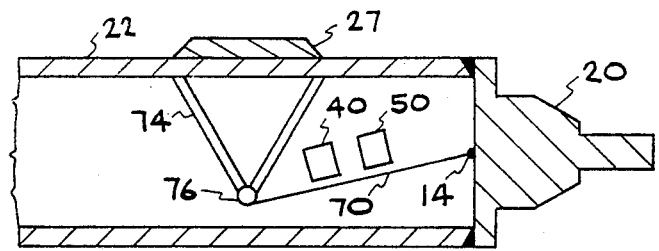
FIG. 3 is a fragmentary vertical cross-sectional view of another embodiment of the invention where the load on a single spindle is monitored.

In FIG. 3, another embodiment of the invention is shown in which the load on each spindle may be independently measured. In this embodiment, a string 70 is attached to the center of spindle 20 at 14, similarly to the attachment of string 10 in the previous embodiment. However, in this embodiment, string 70 is immovably fixed at its opposite end to the string or wire carrier 76 on string support 74. Vibration inducing means 40 and frequency sensor means 50 (or combination means 44) may then be used, as in the previous embodiment, to respectively induce vibration in string 70 and to sense the resonant frequency of vibration of string 70 to thereby determine the load on spindle 20 in the same manner as previously discussed.

Figure 4:
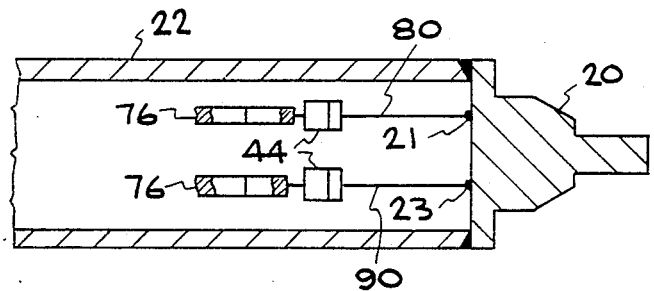
FIG. 4 is a fragmentary top view in section of a third embodiment of the invention where both the load and torque on the end of an axle are determined.

In yet another embodiment, as shown in the top view of FIG. 4, both the load and the torque on spindle 20 may be determined using string means 80 and 90, respectively attached to a front position 21 and a rear position 23 on spindle 20, with strings 80 and 90 respectively positioned (as viewed from the side) similarly to string 70 shown in the side view of FIG. 3. As in the embodiment of FIG. 1, while only one string each is illustrated, respectively, for string means 80 and 90, one or more such strings may be used in both the front and rear positions for the reasons previously discussed.

In this embodiment, the tension in each string 80 and 90 is respectively monitored by means similar to the previous embodiments using either vibration inducing means 40 and frequency sensing means 50 or, as shown in FIG. 4, combination vibration inducing and frequency sensing means 44.

However, in the FIG. 4 embodiment, not only is the load on spindle 20 measured, using the measured frequency of either string 80 or string 90 (or a combination of both), but the torque acting on the end of the axle attached to spindle 20 is also measured. For example, during acceleration and/or braking, there may be a considerable torque exerted on the axle tube.

For example, with a braking torque applied to axle tube 22 by brakes (not shown) front string 80 will become shorter resulting in lower tension and a lowered vibration frequency while rear string 90 will stretch resulting in higher tension and a higher resulting resonant frequency of vibration. The measured differences in frequency of strings 80 and 90 may then be used to determine the torque on axle tube 22.

It should also be noted that the embodiment of FIG. 4 may be used to independently measure the load and torque on either a single spindle, as in the independent load measurement of the embodiment of FIG. 3, or to measure the combined load and torque on both ends of an axle as in FIG. 1.

The FIG. 4 embodiment has an additional advantage in that attachment of the strings to the spindle at points spaced from the axis of rotation of the wheel will permit the use of a driven axle appropriately passed through the center of the spindle or comprising a rotational portion of the spindle. This driven spindle would normally be supported by bearings on the spindle or mounted in the end of the axle tube.

Figure 5:
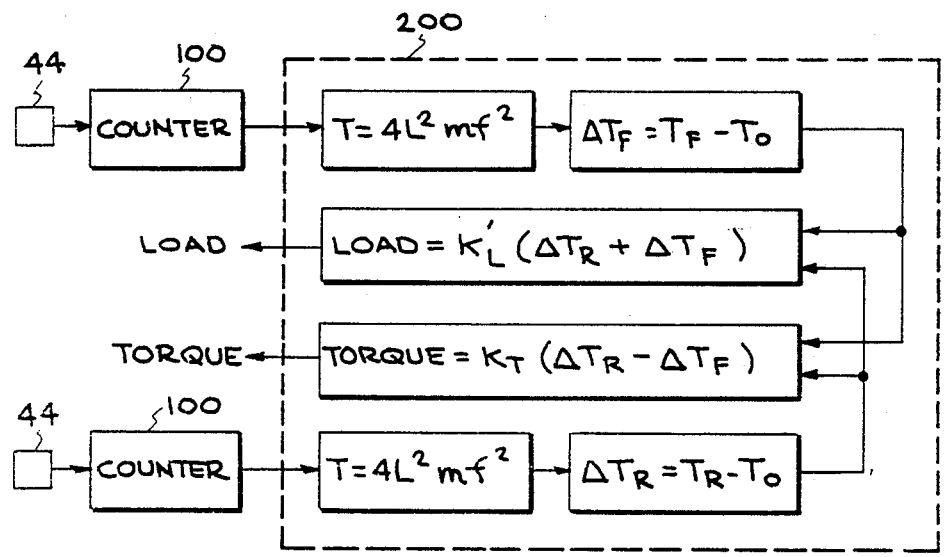
FIG. 5 is a diagram showing the process for determining the load and/or torque from the measured tension in the respective front and rear strings attached to the spindle of a vehicle axle.

Referring now to FIG. 5, the determination of both the load and the torque on a spindle or axle is illustrated. Sensed vibrations of the string from sensors 44 respectively for the front and rear of the axle or spindle are fed into digital frequency counters 100 and each counter output, which is a digital word equal to the number of cycles of the input signal which occurred during a fixed time period, such as 1 second, is then fed into a small computer, shown as within dotted lines 200. The counter output is normally updated at the same once-per-second rate.

The respective string tensions are calculated, using equation (2), and the changes in tension $\Delta T_f$ and $\Delta T_r$ for both the front and rear of the axle or spindle are determined using equation (3) by comparing the measured tension under load with the previously measured no-load tension. The load is then determined, using equation (5), which is derived from equation (4), by first summing the front and rear changes in tension, $\Delta T_f$ and $\Delta T_r$, as follows:

$$\text{Load} = K_l'(\Delta T_r + \Delta T_f) \tag{5}$$

It should be noted that the constant $K_1'$ shown in equation (5) is not the same as constant $K_1$ used in equation (4) since $K_1'$ is multiplied by the sum of both the changes in tension at the rear and at the front of the axle or spindle. While it would appear that one might simply divide the sum of the front and rear tensions changes by 2 in equation (5) to use the same constant $K_1$ as in equation (4), $K_1$ is a calibration constant which is not only specific to each axle or spindle, as well as to the size of string or wire 10, but also is dependent upon exactly where string 10 is attached to the particular axle. Therefore, for the embodiment of FIG. 4, a new load constant $K_1'$ should be determined by calibration due to the structural changes shown in the embodiment of FIG. 4 compared to the previous embodiments.

The torque acting on the end of the axle is also calculated from the measured changes in the front and rear tensions by multiplying the difference between the respective measured tension changes for the front and rear of the axle by a torque calibration constant $K_t$ as follows:

$$\text{Torque} = K_t(\Delta T_r - \Delta T_f) \quad (6)$$

It should be further noted that when calibrating the load and torque sensing system for a given axle or spindle, it may be necessary to provide additional constants, respectively for $\Delta T_r$ and $\Delta T_f$ since the front and rear of a given spindle or axle may vary slightly in response to changes of load or torque. Thus, equations (5) and (6) above may be written as:

$$\text{Load} = K_1'(a_1\Delta T_r + a_2\Delta T_f) \quad (7)$$

$$\text{Torque} = K_t'(a_3\Delta T_r - a_4\Delta T_f) \quad (8)$$

where $a_1$, $a_2$, $a_3$, and $a_4$ are the constants for the rear and front of the axle or spindle being calibrated.

Thus, the invention provides a dynamic system for measuring the load and/or torque on a vehicle axle or on each end of such a vehicle axle during operation of the vehicle by monitoring the resonant frequency of a vibrating string as the tension in the string changes due to variations in the load or torque. From the measured frequency the system determines the tension in the string which is compared with the no-load tension to determine the change of tension from which the load may be determined by multiplying this tension change by a constant. Simultaneous load and torque measurements may be obtained by measuring the changes in tension both at the front and rear of an axle or spindle and by using the sum of the changes to determine the load and the difference of the changes in tension to determine the torque.

Having thus described the invention, what is claimed is:

1. A vehicle load sensor apparatus for measuring the load on one or more spindles of a vehicle axle which comprises:
   (a) an axle spindle;
   (b) vibratable string means having one end attached to said axle spindle and an opposite end attached to said axle at a position spaced from said axle spindle; and
   (c) means for determining the load on said spindle by measuring the change of tension in said vibratable string means comprising:
      (1) means for inducing a vibration in said vibratable string means; and
      (2) means for sensing the frequency of said vibration induced in said vibratable string means.

2. The vehicle load sensor apparatus of claim 1 wherein said vibratable string means comprises one or more strings attached to said axle spindle.

3. The vehicle load sensor of claim 1 wherein said means for measuring the change of tension in said vibratable string means includes a single means capable of both inducing a vibration in said vibratable string means and sensing the frequency of said induced vibration in said vibratable string means.

4. The vehicle load sensor apparatus of claim 1 wherein said apparatus further includes means for determining the change of tension in said vibratable string means from a no-load state to a loaded state.

5. The vehicle load sensor apparatus of claim 1 wherein the opposite end of said vibratable string means is attached to a string support on said axle spaced from said spindle.

6. A vehicle load sensor apparatus for measuring the load on one or more spindles of a vehicle axle which comprises:
   (a) first and second axle spindles at opposite ends of an axle;
   (b) vibratable string means having one end attached to said first axle spindle and an opposite end attached to said second spindle; and
   (c) means for determining the total load on said axle by measuring the change of tension in said vibratable string means comprising:
      (1) means for inducting a vibration in said vibratable string means; and
      (2) means for sensing the frequency of said vibration induced in said vibratable string means.

7. The vehicle load sensor apparatus of claim 6 which further includes means for supporting said vibratable string means at a point spaced from said spindles.

8. The vehicle load sensor apparatus of claim 7 wherein said means for supporting said vibratable string means further comprises means for slidably supporting said vibratable string means.

9. The vehicle load sensor apparatus of claim 7 wherein said means for supporting said vibratable string means further comprises means for non-slidably supporting said vibratable string means including means for permitting said string support to move with movement of said vibratable means.

10. A vehicle load and torque sensor apparatus for measuring the load and torque on one or more ends of a vehicle axle which comprises:
   (a) an axle spindle;
   (b) first vibratable string means attached at one end to a position on said spindle horizontally spaced forward of the axis of said spindle and attached at an opposite end to said axle at a point spaced from said axle spindle;
   (c) second vibratable string means attached at one end to a position on said axle horizontally spaced to the rear of said axis of said spindle and attached at an opposite end to said axle at a point spaced from said axle spindle;
   (d) means for measuring the change of tension in said first vibratable string means;
   (e) means for measuring the change of tension in said second vibratable string means; and
   (f) means for determining the load and torque on said spindle using the respective changes in tension in said first and second vibratable string means.

11. The vehicle load and torque sensor apparatus of claim 10 wherein said means for measuring the respective changes of tension in said first and second vibratable string means further includes means for inducing vibrations in said first and second vibratable string means.

12. The vehicle load sensor apparatus of claim 11 wherein said means for measuring the respective changes of tension in said first and second vibratable string means further includes means for sensing the frequencies of said vibrations in said first and second vibratable string means.

13. The vehicle load sensor of claim 12 wherein said means for measuring the respective changes of tension in each of said vibratable string means includes a single means capable of both inducing a vibration in said vibratable string means and sensing the frequency of said induced vibration of the same said vibratable string means.

14. A method for measuring the load on one or more spindles of a vehicle axle which comprises:
 (a) providing an axle spindle;
 (b) attaching one end of vibratable string means to said axle spindle;
 (c) attaching an opposite end of said vibratable string means to said axle at a point spaced from said axle spindle; and
 (d) determining the load on said spindle by measuring the change of tension in said vibratable string means by:
   (1) inducing a vibration in said vibratable string means; and
   (2) sensing the frequency of said vibration of said vibratable string means.

15. The method of claim 14 wherein said step of determining the load on said spindle by measuring the change of tension in said vibratable string means further comprises:
 (i) measuring the resonant frequency of vibration of said vibratable string means;
 (ii) determining the tension in said vibratable string means from said resonant frequency; and
 (iii) comparing said measured tension and a previously measured tension corresponding to a no-load condition on said spindle to determine the load on said spindle.

16. The method of claim 15 which further includes the step of supporting said vibratable string means at a point spaced from said spindle.

17. The method of claim 16 wherein said step of supporting said vibratable string means further comprises supporting said vibratable string means with a support on which said string means may slide.

18. The method of claim 17 wherein said step of supporting said vibratable string means further comprises nonslidably supporting said vibratable string means with a string support capable of moving with movement of string vibratable string means.

19. A method for measuring the load and torque on one or more ends of an axle having one or more spindles which comprises:
 (a) attaching one end of a string to a spindle at a point horizontally spaced forward of the axis of said spindle and an opposite end of said string to said axle at a position spaced from said axle spindle;
 (b) attaching a second string to said spindle at a point horizontally spaced to the rear of said axis of said spindle and an opposite end of said second string to said axle at a position spaced from said axle spindle;
 (c) measuring the tension in said first string under load or torque;
 (d) measuring the tension in said second string under load or torque;
 (e) determining the change of tension in said first and second strings from said measurements together with the corresponding measurements made in a no-load state;
 (f) determining the load on said spindle from the sum of said measured changes of tension in said first and second strings; and
 (g) determining the torque on said end of said axle from the difference in said measured changes of tension in said first and second strings.

20. The method of claim 19 wherein said respective steps of measuring the tension in said first and second strings further include inducing vibrations in said first and second strings.

21. The method of claim 20 wherein said respective steps of measuring the tension in said first and second strings further include measuring the resonant vibrational frequencies of said first and second strings.

22. A method for measuring the total load on an axle of an vehicle which comprises:
 (a) providing first and second axle spindles at opposite ends of an axle;
 (b) attaching one end of vibratable string means to said first axle spindle and the opposite end of said vibratable string means to said second spindle; and
 (c) determining the load on said axle by measuring the change of tension in said vibratable string means by:
   (1) inducing a vibration in said vibratable string means;
   (2) measuring the resonant frequency of said vibration of said vibratable string means;
   (3) determining the tension in said vibratable string means from said resonant frequency; and
   (4) comparing said measured tension and a previously measured tension corresponding to a no-load condition on said axle to determine the load on said axle.

23. A method for measuring the load on one or more spindles of a vehicle which comprises:
 (a) providing an axle spindle;
 (b) attaching one end of vibratable string means to said axle spindle;
 (c) attaching an opposite end of said vibratable string means to a fixed point spaced from said spindle to permit independent measurement of the load on said spindle; and
 (d) determining the load on said spindle by measuring the change of tension in said vibratable string means by:
   (1) inducing a vibration in said vibratable string means;
   (2) measuring the resonant frequency of said vibration of said vibratable string means;
   (3) determining the tension in said vibratable string means from said resonant frequency; and
   (4) comparing said measured tension and a previously measured tension corresponding to a no-load condition on said spindle to determine the load on said spindle.

* * * * *